(12) United States Patent
Wydrowski et al.

(10) Patent No.: US 7,782,758 B2
(45) Date of Patent: Aug. 24, 2010

(54) EFFICIENT LOSS RECOVERY ARCHITECTURE FOR LOSS-DECOUPLED TCP

(75) Inventors: Bartek Wydrowski, Altadena, CA (US); Sanjay A. Hegde, Pasadena, CA (US); Cheng Jin, Pasadena, CA (US); Steven H. Low, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 474 days.

(21) Appl. No.: 11/382,213

(22) Filed: May 8, 2006

(65) Prior Publication Data

US 2007/0121506 A1 May 31, 2007

Related U.S. Application Data

(60) Provisional application No. 60/678,580, filed on May 6, 2005.

(51) Int. Cl.
*G06F 11/00* (2006.01)

(52) U.S. Cl. .................. 370/216; 370/231; 370/235; 370/252; 709/238

(58) Field of Classification Search .................. None
See application file for complete search history.

(56) References Cited

U.S. PATENT DOCUMENTS

| | | | | |
|---|---|---|---|---|
| 6,018,515 | A * | 1/2000 | Sorber | 370/229 |
| 6,587,985 | B1 * | 7/2003 | Fukushima et al. | 714/748 |
| 6,981,014 | B2 * | 12/2005 | Jayam et al. | 709/200 |
| 2002/0145976 | A1 * | 10/2002 | Meyer et al. | 370/235 |
| 2002/0150048 | A1 * | 10/2002 | Ha et al. | 370/231 |
| 2003/0123481 | A1 * | 7/2003 | Neale et al. | 370/466 |
| 2005/0018617 | A1 | 1/2005 | Jin et al. | 370/252 |
| 2005/0021821 | A1 * | 1/2005 | Turnbull et al. | 709/232 |
| 2005/0259577 | A1 * | 11/2005 | Sin | 370/229 |
| 2005/0286416 | A1 | 12/2005 | Shimonishi et al. | |
| 2006/0050640 | A1 | 3/2006 | Jin et al. | |
| 2006/0095944 | A1 * | 5/2006 | Demircin et al. | 725/81 |

(Continued)

OTHER PUBLICATIONS

Lisong Xu, Binary Increase Congestion (BIC) for Fast Long-Distance Networks, IEEE Infocom. 2004, 0-7803-8356-07/04, pp. 1-11.

(Continued)

*Primary Examiner*—Chi H. Pham
*Assistant Examiner*—Shick Hom
(74) *Attorney, Agent, or Firm*—Morgan, Lewis & Bockius LLP (57) ABSTRACT

The invention provides a method and apparatus for decoupling loss recovery from congestion and window control. The system provides improved performance in high loss environments such as wireless links. The system avoids unnecessary window adjustment in response to packet losses. Transmission rates can be maintained without compromising loss recovery. The invention uses just-in-time Packet Expiration, Transmission Order Queue, a Forward Retransmission Algorithm and Window Control to provide improved performance. The invention maintains a queue of packets in flight called the Transmission Order Queue (TOQ). When an acknowledgement is received for a packet in the in-flight queue, that packet is removed from the queue. If a packet is still in the queue for a certain threshold time, the invention assumes that it is lost. At that point, the packet is removed from the in-flight queue and the packet is retransmitted.

27 Claims, 4 Drawing Sheets

U.S. PATENT DOCUMENTS

2006/0224920 A1* 10/2006 Rooholamini et al. ......... 714/25
2007/0121506 A1   5/2007 Wydrowski et al.

OTHER PUBLICATIONS

Sally Floyd, HighSpeed TCP For Large Congestion Windows, Internet Draft, Internet Engineering Task Force, draft-floyd-tcp-highspeed-02.txt, pp. 1-26.

Tom Kelly, Scalable TCP: Improving Performance in Highspeed Wide Area Networks, Apr. 2003, http://www-1ce.eng.cam.ac.uk/~ctk21/scalable, pp. 1-8.

Claudio Casetti et al., TCP Westwood: End-to-end Congestion Control for Wired/Wireless Networks, Wireless Networks 8, pp. 467-479 (2002).

S. Floyd, The NewReno Modification To TCP's Fast Recovery Algorithm, Network Working Group, Request For Comments 2582, Apr. 1999, pp. 1-13.

Brakmo & Peterson, TCP Vegas: End to End Congestion Avoidance On A Global Internet, IEEE Journal On Selected Areas In Communications, V.13, N. 8, Oct. 1995, pp. 1-16.

Sanjay Hegde et al., Fast TCP in High Speed Netowrks: An Experimental Study, Proceedings of Gridnets, Oct. 29, 2004, San Jose, CA pp. 1-9.

Cheng Jin et al., Fast TCP: Motivations, Architecture, Algorithms, Performance, 0-7803-8355-09/04, 2004, IEEE, pp. 2490-2501.

PCT US05/29329, International Search Report, related to copending U.S. Appl. No. 11/206,445.

PCT US06/17793, International Search Report, counterpart case to current application.

PCT US06/17793, Written Opinion, PCT counterpart to current application, pp. 1-5.

* cited by examiner

EFFICIENT LOSS RECOVERY ARCHITECTURE FOR LOSS-DECOUPLED TCP

This patent application claims priority to provisional patent application 60/678,580 filed on May 6, 2005 and incorporated by reference herein in its entirety.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

FEDERAL SUPPORT STATEMENT

The U.S. Government has certain rights in this invention pursuant to AFOSR Grant No. F49620-03-1-0119 and pursuant to National Science Foundation Grant No. ANI 0230967.

BACKGROUND OF THE INVENTION

1. Field of the Invention

This invention relates to the field of networks and to methods and apparatus for loss recovery.

2. Background

Computer networks allow communication between one or more computers. Networks include local area networks (LANs), wide area networks (WANs), the Internet, wireless networks, mixed device networks, and others. An example of one such network is the Internet, which uses TCP (Transmission Control Protocol) as a communication protocol. One limitation to the efficient use of networks is network congestion, when the number of message sources and destinations and the amount of message traffic, is greater than the network can handle efficiently. In the prior art, such congestion problems are handled by implementing a congestion control algorithm. The congestion control algorithm operates by adjusting the size of a TCP window. A TCP window represents the amount of data that can be transmitted before the sender must wait for an acknowledgement (ACK) from the receiver. As congestion increases, typically the size of the window is reduced. As congestion decreases, the window size is increased to maximize bandwidth use.

In networks such as TCP, data is sent in discrete amounts called "packets". Any particular amount of data that is sent over a network may consist of a plurality of packets. To reconstruct the data, all the packets are reassembled upon receipt. In some instances, the sequence of the packets is important to the reconstruction of the data. It is often the case that packets are lost during transmission. This may be due to corruption of the packet, or interference on the network, or due to lossy network environments, such as wireless networks.

In many prior art schemes, packet loss is used as a measure of congestion in a network. In other words, it is sometimes assumed that the more packets that are lost, the more congested a network may be. However, there are other reasons for packet loss besides congestion. It is well known that existing TCP algorithms that use packet loss as a signal of congestion do not perform well in environments where loss results from other reasons such a link layer error. When packet loss is presumed to be from congestion, each packet loss causes the window to be reduced and thus reduce the transmission rate. It is a disadvantage to unnecessarily reduce the transmission rate on a network due to packet loss when the packet loss is not the result of congestion. In many cases, packet loss problems are better handled by retransmission.

SUMMARY OF THE INVENTION

The invention provides a method and apparatus for decoupling loss recovery from congestion and window control. The system provides improved performance in high loss environments such as wireless links. The system avoids unnecessary window adjustment in response to packet losses. Transmission rates can be maintained without compromising loss recovery. The invention uses just-in-time Packet Expiration, Transmission Order Queue, the Forward Retransmission Algorithm and Window Control to provide improved performance.

The invention maintains a queue of packets in flight called the Transmission Order Queue (TOQ). When an acknowledgement is received for a packet in the in-flight queue, that packet is removed from the queue. If a packet is still in the queue after a certain threshold time, the invention assumes that it is lost. At that point, the packet is removed from the in-flight queue and the packet is retransmitted.

The invention reduces memory accesses to the SOQ (Sequence Order Queue) by avoiding the need to mark packets as lost. This is because the invention implements a "just-in-time" retransmission scheme of lost packets. As soon as a packet is determined or assumed to be lost, it is retransmitted, so there is no need to mark the packet as lost pending some corrective action.

One of the ways the invention provides improved performance is by allowing multiple retransmissions of a packet to be sent in flight concurrently.

BRIEF DESCRIPTION OF THE DRAWINGS

FIG. 1 is a flow diagram illustrating an embodiment of operation of the invention.

FIG. 2 is an embodiment of the Transmission Order Queue of the invention.

FIG. 3 is a flow diagram illustrating an embodiment of the invention.

FIG. 4 is a diagram of the receiver out of order queue of the invention.

FIG. 5 is a diagram of a receiver window in an embodiment of the invention.

FIG. 6 is a diagram of theoretical lost packets in an embodiment of the invention.

DETAILED DESCRIPTION

A method and apparatus for loss recovery is described. In the following description, numerous details are set forth in order to provide a more thorough description of the present invention. It will be apparent, however, to one skilled in the art, that the present invention may be practiced without these specific details. In other instances, well known features have not been described in detail so as not to unnecessarily obscure the present invention.

There are some TCP algorithms that obtain network congestion information from sources other than packet loss. Some schemes receive explicit information from other nodes in a network. Other schemes, such as described in U.S. patent application Ser. No. 10/868,564 filed Jun. 14, 2004 entitled "Method and Apparatus for Network Congestion Control" and U.S. patent application Ser. No. 11/206,445 filed Aug. 17, 2005 entitled "Method and Apparatus for Network Congestion Control Using Queue Control and One-Way Delay Measurements", use delay measurement to determine network congestion and do not rely on packet loss to measure network capacity. This invention provides a loss recovery scheme that works with such protocols to allow them to efficiently utilize network capacity even in the presence of packet loss. The invention provides performance near the theoretical upper bound of (1-l)C for a system with loss rate l and capacity C.

The invention maintains a queue of packets in flight called the Transmission Order Queue (TOQ). When an acknowledgement is received for a packet on the TOQ, that packet is removed from the queue. If a packet is still in the queue for a certain threshold time, the invention assumes that it is lost. At that point, the packet is removed from the in-flight queue and the packet is retransmitted. Note that the first action for lost packets is re-transmission, and only of the packet that is presumed lost. No congestion is assumed due to lost packets and the window size is not changed simply as a result of lost packets. In one embodiment, the queue is such that the oldest packets are in the back of the queue so that when a packet expires it is easy to traverse from the back to the front until you reach unexpired packet. There is no need to traverse and check the entire queue. As soon an expired packet is found, that packet is retransmitted and moved to the head of the in-flight queue.

The invention reduces memory accesses to the SOQ by avoiding the need to mark packets as lost. This is because the invention implements a "just-in-time" retransmission scheme of lost packets. As soon as a packet is determined or assumed to be lost (subject to current sending window limits, the packet) is retransmitted, so there is no need to mark the packet as lost pending some corrective action.

One of the ways the invention provides improved performance is by allowing multiple retransmissions of a packet to be sent concurrently. This 'forward' retransmission addresses the issue of the receiver window limiting throughput under heavy loss, as well as reducing the time to advance the window. The invention includes a method for determining the optimum number of multiple retransmissions.

Congestion Control

The invention is used in one embodiment in a delay based congestion control model and in fact uses queuing delay as a congestion measure, providing advantages over prior art loss based systems. One advantage is that queueing delay can be more accurately estimated than loss probability. This is because packet losses in networks with large bandwidth-delay product are rare events under TCP Reno and its variants (probability on the order $10^{-7}$ or smaller), and because loss samples provide coarser information than queueing delay samples. Indeed, measurements of delay are noisy, just as those of loss probability. Thus, another advantage of the present invention is that each measurement of queueing delay provides multi-bit information while each measurement of packet loss (whether a packet is lost) provides only one bit of information for the filtering of noise. This makes it easier for an equation-based implementation to stabilize a network into a steady state with a target fairness and high utilization. In addition, the dynamics of queueing delay provides scaling with respect to network capacity. This helps maintain stability as a network scales up in capacity. One delay based scheme is described in U.S. patent application Ser. No. 10/868,564 filed on Jun. 14, 2004 and entitled "Method and Apparatus for Network Congestion Control", assigned to the assignee of the present invention and fully incorporated by reference herein. The technique described in the cited and incorporated patent application is referred to herein as "Delay Based TCP".

Operation Flow

Figure 1:
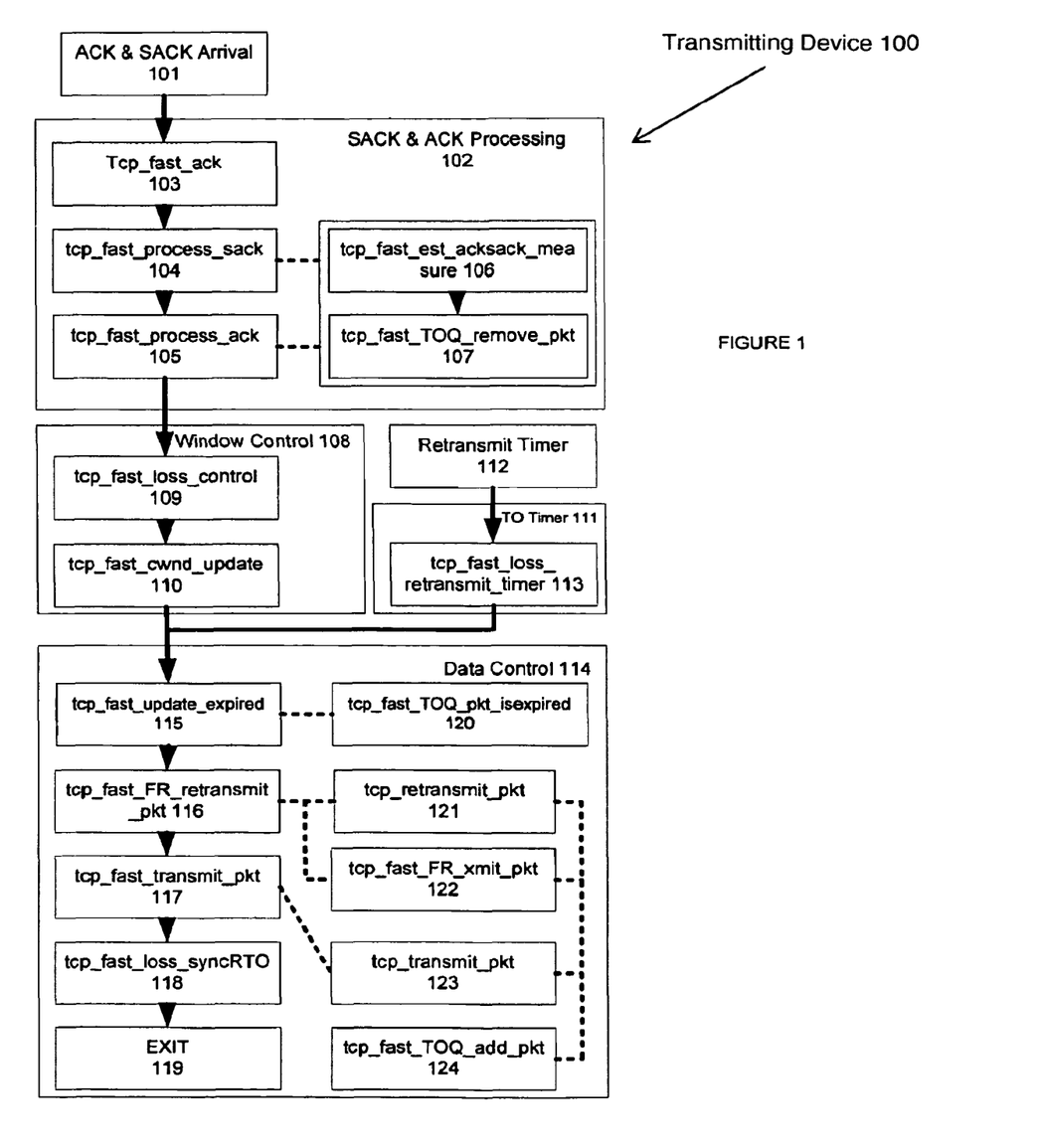

FIG. 1 is a flow diagram illustrating the operation and functionality of an embodiment of the invention as performed by a transmitting device 100. ACK and SACK arrival 101 is handled by SACK & ACK processing 102, Window Control 108, TO Timer 111, and Data Control 114. Note that (S)ACK is used to refer to either a pure ACK packet or a packet with both SACK and ACK information. Referring first to (S)ACK Processing 102, the (S)ACK packet 101 process is handled in tcp_fast_ack 103. The tcp_fast_process_sack function 104 removes the SACKed packet from the Transmission Order Queue (TOQ). The tcp_fact_process_ack function 104 removes the ACKed packed from the SOQ with assistance from the tcp_fast_TOQ_remove packet function 107. Both functions call the tcp_fast_est_acksack_measure 106, which measures the RTT (round trip time), reordering and loss based on each (S)ACK arrival. This function is described below.

Referring now to Window Control 108, the window control function tcp_fast_loss_control 109 computes the window reduction in case the loss exceeds a defined threshold, and then tcp_fast_cwnd_update 110 updates the window. (Loss below the threshold amount is assumed to be from non-congestion reasons and below the threshold the window is not modified). Modifications to the window update are described below. The execution then enters the Data Control stage 114 where packets are transmitted.

Data Control 114 determines which packets to send, and is described further below. To determine how many packets can be sent, Data Control 114 first calls tcp_fast_update_expired 115 to compute how many packets that were considered in-flight have expired using tcp_fast_TOQ_pkt_isexpired 120. Expired packets are retransmitted in tcp_fast_FR_retransmit_pkt 116 which calls tcp_retransmit_pkt 121 and tcp_fast_FR_xmit_pkt 122. Then new data packets are transmitted in tcp_fast_transmit_pkt 117 calling tcp_transmit_pkt 123 and tcp_fast_TOQ_add_pkt 124 to fill the current TCP window. Lastly, tcp_fast_loss_syncRTO 118 resets the timeout timer 111 to just after the expected return time of the oldest unACKed packet and execution is returned to the kernel at Exit 119.

If the execution begins due to a retransmission time-out, the tcp_fast_loss_retransmit_timer 113 function is called. If the connection has timed-out for too long (retransmit timer 112) it is closed by this function. Timeout behaviour is described below. Following timeout processing, execution enters the data control stage.

Figure 3:
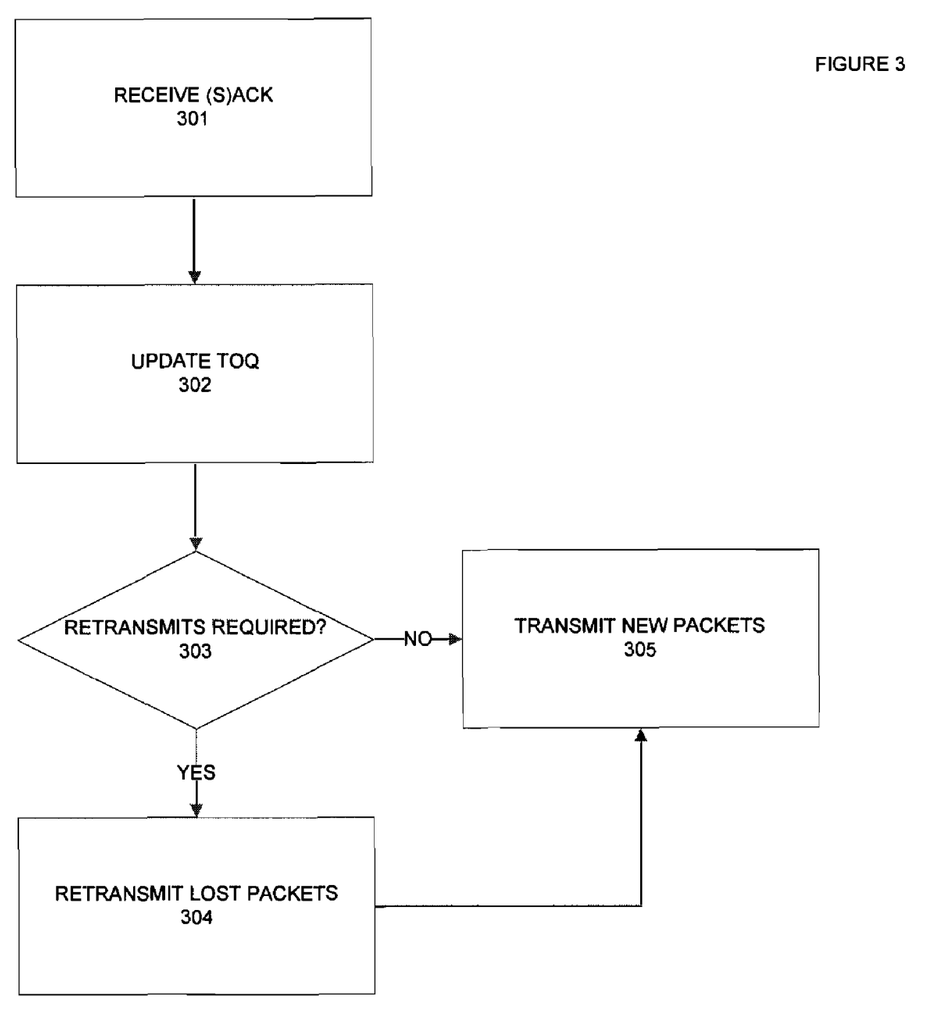

FIG. 3 is a flow diagram of one embodiment of the operation of the invention. At step 301 a (S)ACK is received. At step 302 the TOQ is updated with the packets in flight. At decision block 303 it is determined if retransmits are necessary, due to presumed lost packets. If so, lost packets are retransmitted at step 304. After retransmission of lost packets, or if no retransmits are required at decision block 303, new packets are transmitted at step 305 and the system returns to step 301.

Transmission Order Queue

Figure 2:
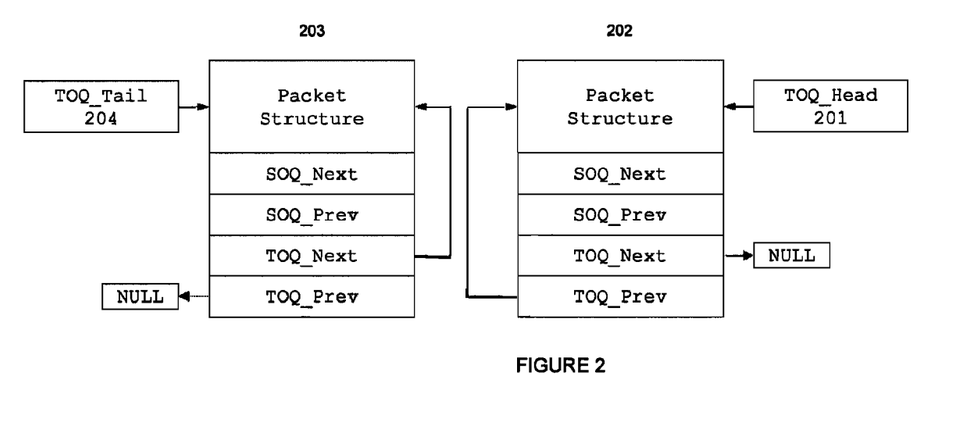

One embodiment of a data structure used in the invention is the Transmission Order Queue (TOQ) illustrated in FIG. 2. The TOQ is a linked list of packets that have been sent, but not yet (S)ACKed. As the name suggests, the packets are arranged in transmission order, and the head 201 of the queue contains the most recently transmitted packet with the tail 204 containing the oldest outstanding packet. This is effectively a queue of in-flight packets.

The TOQ is different from the SOQ. The SOQ contains packets in sequence number order and the TOQ contains packets in transmission order. Initially, the TOQ and the SOQ might be in sync, but as lost packets are retransmitted, the TOQ faithfully represents the packets in flight and is likely to differ from the SOQ. This is because packets such as packets 202 and 203 are not always transmitted in sequence number order due to retransmissions. Also the SOQ does not reflect the packets in flight as SACKed packets are not eliminated from the queue. Note that a packet can be both in the TOQ and the SOQ as the packet structures 202 and 203 contain pointers to both queues as shown in the embodiment of FIG. 2.

A packet is placed on the head of the TOQ when it is transmitted and removed from the queue when it is acknowledged either through a SACK or an ACK. If a packet expires (times-out) it is removed from the tail of the queue, retransmitted and placed at the head of the queue.

The TOQ facilitates the rapid calculation of packets in flight (pif). The value pif is the length of the TOQ minus the number of expired packets on the TOQ. The TOQ need only be traversed from the tail up to the first non-expired packet to determine pif. This is because the nature of the queue is such that all packets closer to the head than the oldest non-expired packet are by definition non-expired as well. When there are losses, the number of packets in flight pif is less than the length of the TOQ. The number of packets in flight pif is not greater than the length of the TOQ in one embodiment of the invention.

Packet Buffer Extensions

The following illustrates packet buffer fields in one embodiment of the invention.

```
struct pkt      *TOQ_next;
struct pkt      *TOQ_prev;   u8      TOQ_flag;
       _u16     TOQ_xmits;
       _u16     TOQ_expires
       _u8      TOQ_inflight;
       _u64     TOQ_send_time[TCP_FAST_MAX_XMITS];
       _u32     TOQ_send_tsval [TCP_FAST_MAX_XMITS]
       _u32     PIF_recv[TCP_FAST_MAX_XMITS];
       _u32     PIF_sent [TCP_FAST_MAX_XMITS]
       _u64     pkt_index;
```

The fields TOQ_next and TOQ_prev are the pointers to the next and previous elements in the TOQ linked list. Referring to FIG. 2 it can be seen that packet 202 includes a TOQ_prev field pointing to packet 203 and that packet 203 includes a TOQ_next field pointing to packet 202. The TOQ_flag flag indicates that the packet is indeed on the TOQ. The TOQ_xmits is a count of the number of transmissions of this packet, and TOQ_inflight is a count of how many of these transmissions are in-flight. (Note, more than one transmission of a packet may be in flight due to the Forward Retransmission mechanism described below.) For each transmission of the packet, the TOQ_send_time array stores a high-resolution time stamp made when the packet is sent, and the TOQ_send_tsval array stores the coarse resolution time stamp sent in the tsval field of the packet. Only information about the last TCP_FAST_MAX_XMITS transmissions is stored. The PIF_sent array stores the value of pif at the time of sending each transmission of the packet and the PIF_recv array stores the number of packets acknowledged between the time the packet is sent and its acknowledgement is received. The pkt_index field stores a unique packet identifier that identifies the original transmission. The identifier is incremented for each new packet transmission (not incremented for retransmissions).

RTT, Loss And Reordering Measurement

In order to accurately measure loss, reordering, or RTT in heavy loss environments, it is important to be able to identify which transmission of a packet generated the ACK or SACK for that packet. If a packet was never retransmitted, then receiving an ACK or SACK for the packet unambiguously gives an RTT or reordering measurement. If a packet was transmitted and retransmitted one or more times, when an ACK or SACK is received for the packet, it is ambiguous as to which transmission of the packet generated the (S)ACK without additional information. For example, even though there is an assumption that a packet is lost if an ACK is not received within a certain time threshold, it may be possible that the packet considered "lost" is delivered and acknowledged. If the packet was retransmitted prior to the ACK, then it would not be known which transmitted packet was being ACKed. If it was possible to redesign the TCP signaling, an unambiguous way of identifying which packet caused the (S)ACK to be generated would be ideal. However, an advantage of the current design is that it works with existing TCP receivers.

In one embodiment of the invention, there are two rules for identifying (S)ACKs for multiply retransmitted packets. The first rule is to use the timestamp option to help identify the packet transmission. RFC 1323 mandates that "An ACK for an out-of-order segment should therefore contain the timestamp from the most recent segment that advanced the window." However, not all operating systems accurately implement RFC1323 and it has been found that this rule could not always be relied upon. The matching of timestamp values in ACKs to retransmissions sent should be conservative due to implementation differences such as noted above. Only the (S)ACK for the first retransmission using a particular timestamp value is used to make RTT or reordering measurements that rely on the timestamp to identify the packet transmission.

If the first rule is not satisfied, then the second rule is used. With this rule, a measurement of the RTT is made for all transmissions of a particular packet, oldest to most recent, and the first measurement that is within $RTT_{min}$ and $RTT_{max}$ is taken. This measurement gives a conservative RTT measurement, as the oldest packet that fits inside the bound gives the largest RTT.

Once the transmission of the packet that caused the (S)ACK is identified, a measurement of RTT, packet reordering, and loss is possible. The measurement of RTT is done using the high-resolution send timestamps stored in the packet structure, (not the coarse TCP timestamp options timestamp). Packet j is sent at time $t_j^S$ and its (S)ACK arrives at time $t_j^R$ resulting in an RTT measurement of $$RTT(t_j^R) = t_j^R - t_j^S \qquad (1)$$

which is assigned to the newest _rtt variable.

It has been observed that networks such as the Internet reorder packets. Such reordering is caused by a number of different mechanisms, including parallelism in routers, as well as load balancing on paths. To measure reordering, let j=pkt_index and let the highest received packet index at the time $t_j^R$ when j is received be $j_{max}(t_j^R) \geq j$. Then the reordering measured as Packet Lag is $$r(t_j^R) = j_{max}(t_j^R) - j \qquad (2)$$

The reorder variable, which is the current re-ordering level, is updated to capture the highest re-ordering level measured, but is also decayed over time if reordering decreases. Let $r_{max}(t)$ be the maximum r(t) recorded over the last 50 RTTs. Then reorder is set to r(t) if r(t)>reorder or is reduced by $0.5 \cdot (reorder - r_{max}(t))$ every 50 RTTs if $r_{max}(t)$<reorder.

When the packet which caused the (S)ACK can be identified, then the loss rate can also be computed as the pif at the time of sending the packet is known. Let pi $f_{sent}(t_j^R)_i$ be the pif at time $t_j^S$ when packet j was sent by source i, but measured at time $t_j^R$ when the acknowledgement for j is received. Ignoring reordering, (S)ACKs received between $t_j^S$ and $t_j^R$ are for packets that were in flight at time $t_j^S$. Let pi $f_{recv}(t_j^R)_i$ be the amount of packets acknowledged, between the time j is sent and its acknowledgement arrives at time $t_j^R$. Note that pi $f_{recv}(t_j^R)_i$ can be obtained by counting the number of packets removed from the TOQ by (S)ACKs between $t_j^S$ and $t_j^R$. Then loss rate is $$l(t_j^R) = \frac{pif_{sent}(t_j^R)_i - pif_{recv}(t_j^R)_i}{pif_{sent}(t_j^R)_i} \quad (3)$$

Retransmission Mechanism

One aspect of loss recovery is determining when to retransmit a packet. Since a packet may be delayed indefinitely in the network, and the network does not generate an explicit loss signal, it may not be possible to determine with certainty if a packet is lost. Therefore the invention only determines if the packet is 'expired', which is the condition that it has not been acknowledged in a certain time given what is known about the transmission path. The invention builds on TCP mechanisms for determining packet expiration using the existing ACK and SACK signals. In one embodiment, a packet is considered expired if no ACK is received after current RTT plus some delta amount. In one embodiment the delta amount is the re-ordering lag time. In one embodiment of the invention, the RTT is used to expire packets based on time, whereas the index is used to expired packets based on receive order.

In one embodiment, let newest.index be the highest index of any ACKed or SACKed packet received, and newest_rtt be this packet's instantaneous RTT. Then a packet which lags behind the packet of index newest_index more than the re-ordering lag reorder is determined to be expired. Outstanding packets with indices greater than this are expired by timeout, based on the most recent RTT measurement and a tolerance of delta_rtt. The following algorithm summarizes this mechanism and returns true if the packet is expired:

```
pkt_is_expired(pkt) {
    if pkt.index + reorder < newest_index
        return true
    if pkt.time + newest_rtt + delta_rtt < t
        return true
    else
        return false
}
```

The parameter delta_rtt should accommodate the random variations in delay so that packets are not expired prematurely. One embodiment takes the difference between the maximum and minimum observed RTTs, delta_rtt=$RTT_{min}$-$RTT_{max}$. In an alternate embodiment, a standard deviation parameter may be used.

In one embodiment of the invention the decision as to whether a packet is lost is made 'just-in-time' at the moment before it can be retransmitted. Unlike other existing methods, packets are no longer marked as lost when SACKs arrive. This eliminates the need to traverse the SOQ during SACK processing and there is no undoing of blocks of packets that are marked as lost if subsequent SACK arrivals suggest otherwise.

The tcp_fast_update_expired 115 checks for packet expiration each time the TCP stack is executed, which is at the arrival of any (S)ACK and when the timeout timer is generated. Due to the ordered nature of the TOQ, only the expired packets need to be traversed in the queue, and since they are immediately retransmitted by tcp_fast_FR_retransmit_pkt, they are taken off the end of the TOQ and need not be checked again for another RTT. The basic retransmit function is

```
tcp_fast_FR_retransmit_pkt ( ) {
    pkt=TOQ.tail
    while( pkt!=NULL && pkt_is_expired(pkt)
        && pif < cwnd ) {
        tcp_fast_FR_xmit_pkt(pkt)
        pkt=pkt.TOQ_next
    }
}
```

Timeout Mechanism

The timeout timer occurs just after the expiration time of the oldest outstanding packet on the TOQ in case there are no (S)ACK arrivals. Each time the timeout event is generated, with no (S)ACKS arriving between the previous timeout, the timeout time is increased. The timeout time is $$TO_i = t + newest\_rtt \cdot B(T_i) \quad (4)$$

where Ti is the number of timeouts since the last (S)ACK that resulted in taking a packet off the TOQ and B(•) is an array of back-off values:

[1 1 2 3 4 8 16 128 512 2048
4096 16384 32768 65536 . . . 65536]

When a (S)ACK arrives that causes a packet to be removed from the TOQ, $T_i$ is reset to 0. When $T_i$ reaches 15, the TCP connection is closed. Note that to ensure comparable disconnect behaviour to. TCP/Reno, the sum of the timeout times is similar. The timeout sequence of one embodiment of the invention is less conservative than in some prior art schemes, such as TCP/Reno, as it does not double the timeout time at every stage. The conservative timeout in TCP/Reno is not suited to lossy wireless environments.

Sack Processing

The SACK processing has been optimized to reduce the traversal of the Sequence Order Queue (SOQ) in order to tag packets as being SACKed. The SOQ contains all of the sent but not yet acknowledged packets in sequence order. With high BDP (Bandwidth Delay Products) connections, SOQ length can impose a significant processing burden with the traversal and tagging process. One existing SACK processing algorithm in TCP/Reno requires a traversal of the SOQ from the beginning up to the location of the SACK block to mark lost or SACKed. This causes access to a large section of memory, which is slow and inefficient for the CPU's cache.

The invention reduces the amount of memory access by a number of methods. Firstly, when processing a SACK packet, the SOQ does not need to be scanned from the beginning as packets do not need to be explicitly marked as lost. This is facilitated by the packet expiration check being done 'just-in-time' before packet retransmission as described above.

Secondly, as consecutive SACK packets often reference the same SACK block, a pointer to the most recent SACK block in the SOQ is maintained for each SACK block in the packet.

Thirdly, a new SACK optimization is introduced for the case when the SACK in the packet points to a new SACK block not referenced by these pointers. The optimization involves a lookup table that speeds up finding a particular packet buffer on the SOQ based on its sequence number.

The Sequence Order Queue Lookup Table SOQLT (SOQLT) has SOQLT_SIZE elements, where each element contains a pointer to a packet on the SOQ, its sequence number and a valid flag. As packets are added to the SOQ, every (SOQ_length divided by SOQLT_SIZE)$^{th}$ pkt is put into the SOQLT and is marked as valid. When a SACK arrives, the SOQLT is scanned to find the nearest packet to the required sequence number, so that the SOQ traversal can be started from this point. This reduces the worst-case traversal of the SOQ by a factor of SOQLT_SIZE.

If a pkt is removed from the SOQ, the corresponding valid flag in the SOQLT is cleared. So that not every removal of a packet from the SOQ requires scanning of the SOQLT table to see if the packet was on the SOQLT, a bit field is introduced in the packet buffer TOQ.flags that flags if the packet is on the SOQLT.

Receiver Window Limit

Figure 4:
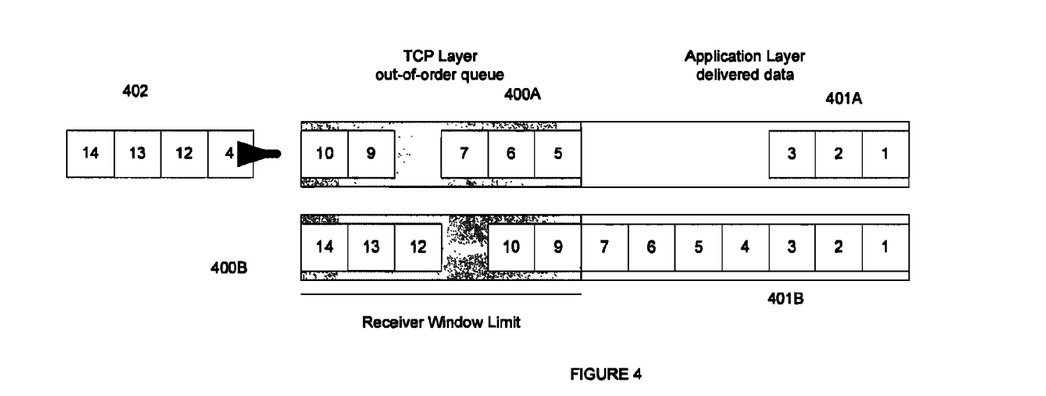

To ensure in-sequence delivery of packets to the application layer, the receiver maintains an Out-of-Order Queue (OOQ) that contains all the packets received with sequence number greater than the first missing packet. FIG. 4 illustrates the OOQ 400A, and shows a scenario where packets 1,2 and 3 have been delivered to the application layer 401A. In the example shown, packet 4 is missing packets so packets 5,6, 7,9 and 10 are sitting in the OOQ 400A (since they are out of order). In the next step, packets 4,12,13 and 14 arrive. As a result, the next in-sequence block of packets 5,6 and 7 can be delivered to the application layer 401B. However, now blocks 9 and 10 are out of order, along with blocks 12, 13 and 14 in OOQ 400B.

Figure 5:
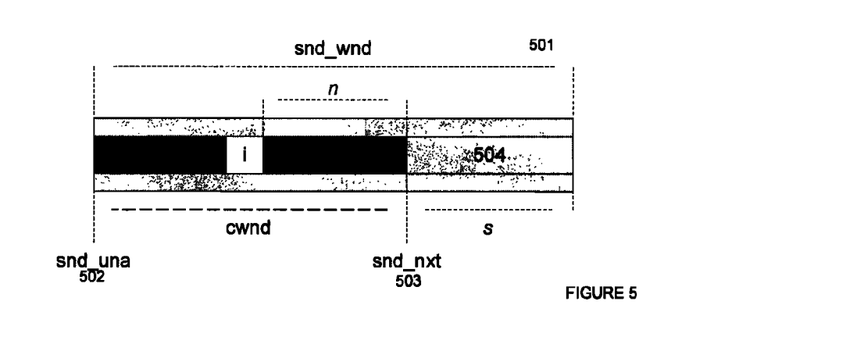

The length of the OOQ can impact performance, as a review of TCP data control variables will show. FIG. 5 shows the receiver advertised window 501, (called snd_wnd in the Linux TCP implementation), the sequence number 502 of the next expected acknowledgement snd_una, the sequence number 503 of the next new packet to send snd_nxt, and the spare receiver OOQ space s 504, where s=snd_una+snd_wnd−snd_nxt. The diagram also shows a packet i which is l packets back from the highest sequence numbered packet sent.

When the loss and BDP increase, the number of discontinuous sequences of packets on the OOQ is also expected to increase. Note that the sender only transmits packets that fit into the receiver window, in other words, for any packet i sent with sequence number $seq_i$, snd_una +snd_wnd$\geq seq_i$, which implies that snd_nxt−snd_una$\leq$snd_wnd. Therefore snd_wnd also limits the sending window. The receiver window may limit performance in a lossy environment with high BDP.

Lets assume that the loss rate is a constant l so that when a window w of packets is sent wl are lost. After one RTT, all of the wl are retransmitted, and of these wl$^2$ are lost. After n RTTs the number of packets missing from the original window is wl$^n$. If l is small, so that retransmissions only take a small percentage of the transmission rate, then each RTT w packets are added to the length of the OOQ.

The required length of the receiver window is then w times the number of RTTs it takes to receive all of the w in-sequence packets at the head of the OOQ. The number of RTTs required so that only k packets are missing from first w packet sent is $$n(k, l, w) = \log_l\left(\frac{k}{w}\right) \quad (5)$$

At even moderate loss rates and BDPs, the receiver window has to be several times the BDP to maintain a high throughput. The current TCP implementations do not advertise such high receiver windows, and can thus limit the performance. Until now, this problem was not critical, as TCP could not sustain high throughput in the presence of loss. In the following section we discuss an embodiment to mitigate this problem without having to change the receiver.

Data Control and Forward Retransmission

The data control algorithm determines what packet to send next. One of the ways the invention provides improved performance is by allowing multiple retransmissions of a packet to be sent concurrently. This 'forward' retransmission addresses the issue of the receiver window limiting throughput under heavy loss, as well as reducing the time to advance the window.

One rule for TCP data control is: 1) If there are no expired packets, the sender always sends new data. 2) If there are one or more expired packets, the sender retransmits all expired packets before transmitting new data. Therefore, the amount of new data that can be sent n(t) over one RTT starting at time t is $$n(t)=\text{cwnd}-r(t) \quad (6)$$

where r(t) is the number of retransmissions over this period. The number of retransmissions r(t) is the amount of packets lost in the previous RTT plus the number of previous retransmissions lost, $$r(t)=n(t-1)l+r(t-1)l \quad (7)$$

Combining (6) and (7) gives $$n(t)=\text{cwnd}\cdot(1-l) \quad (8)$$

$$r(t)=\text{cwnd}\cdot l \quad (9)$$

which agrees with the C(1−l) transmission upper-bound.

A packet i, be it new data or a retransmission, can be sent only if pif<cwnd and $seq_i$ <snd_una+snd_wnd. The invention differs from the previous TCP implementations, as it limits the packets-in-flight to cwnd, not the number of unacknowledged packets, so the limit snd_nxt−snd_una<cwnd does not apply.

Figure 6:
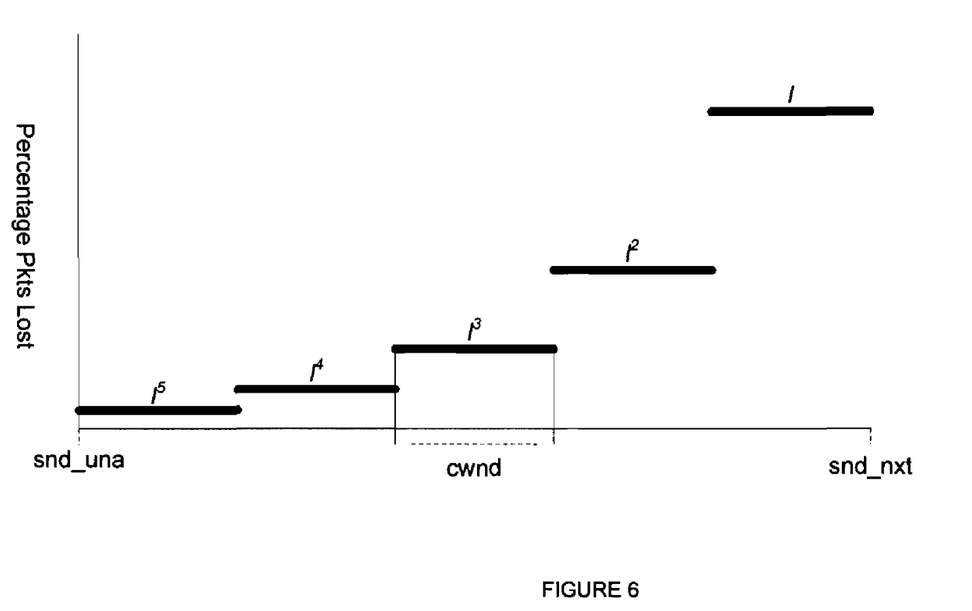

Typically snd_wnd>cwnd so that transmission rate is not limited by the receiver window. As discussed above, with loss, the lowest sequence numbered lost packet stops the advance of snd_una and also stops the sending of new data beyond snd_una+snd_wnd. From (8) it is evident that the sender will only be able to send at the upper-bound if snd_una advances by cwnd•(1−l) each RTT. To achieve this, the OOQ limit of snd_una+snd_wnd must be large enough so that as the packet moves from being snd_nxt to being closer to snd_una, there have been a sufficient number of RTTs for enough retransmissions to successfully deliver the packet. FIG. 6 shows the theoretical distribution of lost packets throughout the OOQ. With a sufficiently large snd_wnd, all lost packets are successfully retransmitted by the time they reach the snd_una end of the OOQ, and snd_una can advance unimpeded.

If snd_wnd is not long enough, once the spare capacity has been exhausted, s=0, the sender can only send retransmissions of packets between snd_una and snd_nxt. If a lost packet at the head of the OOQ is delivered, snd_una advances and new data can be sent, increasing the goodput. This suggests that to maintain the transmission rate in a heavy loss and receiver limited environment, the algorithm should prioritize the delivery of lost packets at the head of the OOQ to advance snd_una. This is accomplished with the forward retransmission (FR) algorithm.

The FR algorithm essentially decides how many instances of a given packet should be sent in flight simultaneously. If the sender is not receiver limited, this number should be 1 so that no capacity is wasted on unnecessary retransmissions, which is the default TCP behavior. However, for a receiver limited environment a method for determining the correct amount of forward transmission to maintain the highest useful rate is important. Since there are many factors that could be taken into account in determining the number of FRs, it is not apparent that there is one ideal FR strategy. In one embodiment, a heuristic FR algorithm is used.

FIG. 5 shows variables used in determining the number of FRs required for a packet i which is n packets back from the highest sequence numbered packet sent. The FR algorithm determines the number of simultaneous retransmissions $F_i$ for packet i based two factors, the scarcity of the receiver window $FR_i$ and the position of i in the OOQ $FP_i$, with $F_i = FR_i\ FP_i$.

The packet transmitted with the highest sequence number has n=0 and the packet holding up the OOQ has n=snd_nxt−snd_una. The forward transmission rate should increase with n to prioritize the packets holding up the OOQ or packets likely to soon be blocking the OOQ. Note that if a packet has position n in the OOQ, it has been retransmitted at least n/cwnd times already, which suggests a loss rate of max(0,1−cwnd/(cwnd+n)) for this packet. One would expect to have to retransmit this packet at least n/cwnd times again, so let $FP_i = n/cwnd$. Thus $FP_i$ accounts both for the loss rate and the packet's position in the OOQ.

If the receiver window space is limited, the forward transmission rate should increase. Since the amount of receiver space necessary increases with cwnd, let $FR_i = cwnd/s$.

Note that $F_i$ can be unbounded as s→0, so some reasonable constraints are imposed in one embodiment. Let p be an average packet pass rate p=1−l. Let W be the OOQ size W=snd_nxt−snd_una. In one embodiment, limit the number of forward retransmissions to 3 times the expected number of retransmissions, and design the constraint to allow the undelivered packets at the head of the OOQ the most priority. The combined FR rule is then $$F_i = \min\left(\frac{n}{s}, \frac{3n}{pW}, 1\right) \quad (10)$$

This rule is evaluated in the tcp_fast_FR_xmit_pkt function 122 each time a packet is retransmitted. While one embodiment sends all FRs at the same time, in an alternate embodiment, all Fi retransmission are spaced over time to avoid burst losses.

Window Control

While the invention allows loss recovery to be decoupled from window control, reacting to loss is still prudent if the congestion signal is not entirely robust. For instance, with delay-based protocols such as delay based TCP, small buffers on the network path may not be large enough to cause measurable delay, yet the buffer may lose packets due to congestion. In this case, reacting to loss is necessary to avoid congestion collapse.

Here we present an example of how a loss signal may be unified into a delay based TCP window control algorithm. The design allows a controllable tolerance to loss. If loss is below the parameter $\theta_i$, the source does not slow down. Once the loss rate exceeds $\theta_i$, the transmission rate is reduced. The loss threshold is useful for lossy environments such as wireless, where a small loss due to congestion is expected. Slowing down in heavy loss gives the algorithm robustness to load related loss, such as the small buffer case.

The delay based TCP window control law in [8] is $$w(t+1)_i = \frac{w(t)_i + \frac{RTT_{min}(t)_i}{RTT(t)_i} w(t)_i + \alpha_i}{2} \quad (11)$$

We introduce two parameters to reduce transmissions rate during heavy loss, an α, scaling term $0 \leq L_A(t)_i \leq 1$ and an $RTT_{min}(t)_i$ scaling term $0 \leq L_B(y)_i < 1$, $$w(t+1)_i = \frac{w(t)_i + \frac{RTT_{min}(t)_i}{RTT(t)_i} w(t)_i \cdot L_B(t)_i + \alpha_i \cdot L_A(t)_i}{2} \quad (12)$$

Both terms are used to deal with boundary cases where either the buffer is very low, or propagation delay is very low. If we only had the $L_A(t)_i$ parameter to reduce rate with, applying the maximum control with $L_A(t)_i=0$ when $RTT_{min}(t)_i = RTT(t)_i$ results in $w(t+1)_i = w(t)_i$ which does not reduce the window. Even if $RTT(t)_i = RTT_{min}(t)_i + e$ and $e \ll RTT_{min}(t)_i$, the window reduction is very slow. If we only had the $L_B(t)_i$ parameter to reduce the rate with, applying the maximum control with $L_B(t)_i=0$ only limits the minimum $w(t)_i$, to $\alpha_i$. If the bandwidth delay product is less than $\alpha_i$ the source could continue to overflow the buffer. The addition of these factors change the equilibrium properties such that $$x_i = \frac{\alpha L_A(t)_i}{q_i + RTT_{min}(t)_i \cdot (1 - L_B(t)_i)} \quad (13)$$

The challenge is how to control $L_A(t)_i$ and $L_B(t)_i$ to achieve flow fairness and robustness to moderate loss. For simplicity, the design uses only one control term $L(t)_i$, and we let $L_A(t)_i = L_B(t)_i = 1 - L(t)_i$. The $L(t)_i$ term is controlled by an integral controller so that it increases if loss is greater than $\theta_i$ according to $$L(t+1)_i = \min(\max(L(t)_i + \delta(t)_i, 0), 1) \quad (14)$$

where, $$\delta(t)_i = l(t)_i - \theta_i - \frac{k_i}{x(t)_i} \quad (15)$$

and $l(t)_i$ is the loss rate experienced by source i at time t. This results in an equilibrium $x_i$ of $$x_i = \frac{k_i}{l_i - \theta_i} \text{ if } l_i > \theta_i; \quad x_i = \frac{\alpha_i}{q_i} \text{ if } l_i \leq \theta_i \quad (16)$$

where $l_i$ is the equilibrium loss rate. Note that in the case where $l_i \leq \theta_i$, $L(t)_i = 0$ and $x_i$ is bounded by queueing delay alone. Assuming that all flows experience the same loss $l_i$, or same $q_i$, (16) results in equal $x_i$ allocation.

Note that the implementation used for testing in this embodiment uses pif $(t)_i$ in (14) instead of $x(t)_i$, which results in equal pif allocation. A design using $x(t)_i$ may also be used in another embodiment. The update rate of $L(t)_i$ is limited by the time it takes to make an accurate measurement of $l(t)_i$. In the current implementation, the update is made when at least $1/\theta_i$ (S)ACKs that give a $\text{pif}_{sent}$ and $\text{pif}_{recv}$ measurement have arrived, but no more than once every RTT.

Central to achieving fairness with (16) is that each flow should see the same loss rate $l(t)_i$ at a given network load regardless of its send rate. However, in practice this is not always found to be the case. As packets are often transmitted in bursts, the load related losses are also often bursty. Consider a flow with window w that sends one burst of b packets every RTT and the rest w−b packets paced evenly across the remaining time. The flow transmits over a buffer size of B packets with B<b, so that b−B packets are lost each RTT due to buffer overflow. Then the loss rate of the flow is (b−B)/w and the flow rate experiences a higher loss rate as the window is reduced. So two bursty flows with different windows sharing the same low buffer bottleneck would experience different loss rates, and fairness would not be achieved. An alternate embodiment uses a method to measure a loss rate that suffers less from this bias introduced by the sending process.

What is claimed is:

1. A method of transmitting packets over a network, comprising:
   at a transmitting device:
      maintaining, at the transmitting device, a transmission order queue of transmitted packets;
      detecting passage of a reference time; and
      in accordance with a respective expiration time for each transmitted packet maintained in the transmission order queue and in accordance with the detected passage of the reference time, identifying expired packets from the transmitted packets, and responsively retransmitting each of the expired packets;
   the method further comprising:
   increasing the expiration time in response to satisfaction of predefined criteria that include identifying an additional expired packet;
   detecting successful receipt of at least one of the transmitted packets; and
   in response to successful receipt, decreasing the expiration time if greater than a minimum expiration time.

2. The method of claim 1, wherein:
   detecting successful receipt of at least one of the transmitted packets includes detecting a packet acknowledgement; and
   the minimum expiration time is a function of a round trip time of a packet for which successful receipt has been detected.

3. The method of claim 2, wherein:
   the minimum expiration time is dependent upon a sum of the round trip time and a time buffer.

4. The method of claim 3, wherein the time buffer is a value dependent upon a standard deviation of a round trip time variance.

5. The method of claim 1, wherein decreasing the expiration time includes resetting the expiration time to the minimum expiration time upon successful receipt of at least one of the transmitted packets.

6. The method of claim 1, wherein:
   increasing the expiration time includes increasing expiration time up to a maximum expiration time.

7. The method of claim 1, wherein increasing the expiration time includes increasing the expiration time by a non-constant increment.

8. The method of claim 1, further comprising:
   determining whether at least one of a rate of packet loss or a magnitude of packet loss meets a threshold; and
   adjusting a transmission volume in response to whether packet loss meets the threshold.

9. The method of claim 8, wherein:
   determining includes determining whether the rate of packet loss exceeds a predetermined rate; and
   adjusting the transmission volume includes adjusting a size of a congestion window when the packet loss exceeds the predetermined rate.

10. A method of transmitting packets over a network, comprising:
    at a transmitting device:
       maintaining, at the transmitting device, a transmission order queue of transmitted packets;
       detecting passage of a reference time;
       in accordance with a respective expiration time for each transmitted packet maintained in the transmission order queue and in accordance with the detected passage of the reference time, identifying expired packets from the transmitted packets, and responsively retransmitting each of the expired packets;
       determining whether at least one of a rate of packet loss or a magnitude of packet loss meets a threshold, including determining whether a rate of packet loss exceeds a predetermined rate; and
       adjusting a transmission volume in response to whether a packet loss meets the threshold, including adjusting a size of a congestion window when the packet loss exceeds the predetermined rate, wherein adjusting the size of the congestion window includes:
          adjusting the size of the congestion window based upon an output to an equation; and
          adjusting at least one variable in the equation in response to packet loss exceeding the predetermined rate;
          wherein a window size equilibrium point established by the equation is varied in response to the packet loss exceeding the predetermined rate.

11. The method of claim 8, wherein:
    determining includes determining whether the magnitude of packet loss exceeds a predetermined metric; and
    adjusting the transmission volume includes adjusting a size of a congestion window when the packet loss exceeds the predetermined metric.

12. A method of transmitting packets over a network, comprising:
    at a transmitting device:
       maintaining, at the transmitting device, a transmission order queue of transmitted packets;
       detecting passage of a reference time;
       in accordance with a respective expiration time for each transmitted packet maintained in the transmission order queue and in accordance with the detected passage of the reference time, identifying expired packets from the transmitted packets, and responsively retransmitting each of the expired packets;
       determining whether at least one of a rate of packet loss or a magnitude of packet loss meets a threshold, including determining whether the magnitude of packet loss exceeds a predetermined metric; and
       adjusting a transmission volume in response to whether a packet loss meets the threshold, wherein adjusting the transmission volume includes adjusting a size of a congestion window when the packet loss exceeds the predetermined metric, wherein adjusting the size of the congestion window includes:
          adjusting the size based upon the output to an equation; and adjusting at least one variable in the equation in response to packet loss exceeding the predetermined metric;
wherein a window size equilibrium point established by the equation is varied in response to the packet loss exceeding the predetermined metric.

13. The method of claim 1, further comprising:
deleting the successfully received transmitted packet from the transmission order queue; and
for each expired packet
retransmitting the expired packet, and
updating the transmission order queue with respect to the expired packet to reflect a retransmission order relative to a transmission order of other transmitted packets.

14. The method of claim 13, further comprising:
detecting at least one of receipt of an acknowledgment or a timeout based on the reference time; and
for each expired packet, upon detection of at least one of the acknowledgement or the timeout based on the reference time,
retransmitting expired packets; and
updating the transmission order queue with respect to the expired packets to reflect retransmission order relative to transmission order of other transmitted packets.

15. The method of claim 14, further comprising:
maintaining, at the transmitting device, a sequence order queue, wherein the sequence order queue is not updated to reflect retransmission of the expired packets.

16. An apparatus, comprising:
a transmission order queue of a plurality of transmitted packets, wherein each transmitted packet is associated with a separate respective expiration time;
an expiration timer;
logic adapted to use the expiration timer to identify expired packets among the plurality of transmitted packets;
logic adapted to retransmit the expired packets, and to update the transmission order queue with respect to the expired packets to reflect retransmission order relative to the transmission order of other transmitted packets; and
logic adapted to increase the expiration time in response to satisfaction of predefined criteria that include identifying an additional expired packet;
logic adapted to detect successful receipt of at least one of the transmitted packets; and
logic, responsive to successful receipt of at least one of the transmitted packets and adapted to decrease the expiration time if greater than a minimum expiration time.

17. The apparatus of claim 16, further comprising:
a window control mechanism that
detects packet loss;
determines whether the detected packet loss meets at least one predetermined packet loss factor, wherein the packet loss factor is a predetermined packet loss rate or a predetermined packet loss volume; and
adjusts a window size in response to the detected packet loss only when the detected packet loss meets the at least one predetermined packet loss factor.

18. The apparatus of claim 17, wherein the window control mechanism further
identifies detected packet loss as a congestion-based packet loss, wherein congestion-based packet loss is a rate of packet loss exceeding a predefined threshold; and
adjusts the window size in response to the identified congestion-based packet loss in accordance with an adjustment parameter.

19. An apparatus, comprising:
a transmission order queue of a plurality of transmitted packets;
an expiration timer;
logic adapted to use the expiration timer to identify expired packets among the plurality of transmitted packets;
logic adapted to retransmit the expired packets, and to update the transmission order queue with respect to the expired packets to reflect retransmission order relative to the transmission order of other transmitted packets; and
a window control mechanism that
detects packet loss;
determines whether the detected packet loss meets at least one predetermined packet loss factor, wherein the packet loss factor is a predetermined packet loss rate or a predetermined packet loss volume;
adjusts a window size in response to the detected packet loss only when the detected packet loss meets the at least one predetermined packet loss factor;
identifies the detected packet loss as congestion-based packet loss, wherein congestion-based packet loss is a rate of packet loss exceeding a predefined threshold; and
adjusts the window size in response to the identified congestion-based packet loss in accordance with an adjustment parameter, wherein the adjustment parameter includes a product of a loss value and a scaling term, wherein the scaling term decreases in response to packet loss greater than a second threshold.

20. The apparatus of claim 16, further comprising a window control mechanism that adjusts window size in accordance with an adjustment parameter.

21. An apparatus, comprising:
a transmission order queue of a plurality of transmitted packets;
an expiration timer;
logic adapted to use the expiration timer to identify expired packets among the plurality of transmitted packets;
logic adapted to retransmit the expired packets, and to update the transmission order queue with respect to the expired packets to reflect a retransmission order relative to the transmission order of other transmitted packets; and
a window control mechanism that adjusts a window size in accordance with an adjustment parameter;
the apparatus further comprising:
a sequence order queue, wherein the sequence order queue is not updated with respect to expired packets to reflect the retransmission order;
wherein the adjustment parameter is a function of an intermediate node transmission delay and a scaling term that decreases in response to a packet loss greater than a threshold.

22. The apparatus of claim 6, further comprising:
logic adapted to retransmit multiple copies of unacknowledged packets in response to receipt of an out of order packet acknowledgement signal.

23. The apparatus of claim 16, further comprising:
logic adapted to retransmit the expired packets before transmission of packets not previously transmitted.

24. The method of claim 1, further comprising:
invoking a functional call; and
in connection with the functional call,
- identifying as lost packets all transmitted packets for which there is no receipt of a packet acknowledgment where an elapsed time is greater than the expiration time, and
- retransmitting lost packets, the retransmitting including changing transmission order of lost packets to reflect order of retransmission relative to the transmission order of other transmitted packets.

25. The method of claim 24, further comprising detecting packet loss greater than a predetermined metric, and adjusting a size of a congestion window in response to the packet loss only when the packet loss exceeds the predetermined metric.

26. The method of claim 24, wherein:
- the method further comprises maintaining a sequence identifier for the transmitted packets;
- the functional call is invoked upon at least one of a timeout or receipt of a packet acknowledgement; and
- in connection with the functional call, the packets identified as lost packets are retransmitted and re-indexed to reflect a new transmission order that accounts for the retransmission, and the sequence identifier is not changed.

27. The method of claim 1, wherein maintaining the transmission order queue includes storing in the transmission order queue a transmission time corresponding to each of the transmitted packets.

* * * * *